(12) United States Patent
Edwards et al.

(10) Patent No.: US 10,952,576 B2
(45) Date of Patent: Mar. 23, 2021

(54) ADJUSTABLE BATHROOM HANDRAIL ASSEMBLY

(71) Applicant: LIBERTY HARDWARE MFG. CORP., Winston-Salem, NC (US)

(72) Inventors: Neil Edwards, Kernersville, NC (US); Edward Riddle, Winston-Salem, NC (US); Matt Klein, Apex, NC (US); Ty Hagler, Chapel Hill, NC (US); Seth Teeples, Woodinville, WA (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 0 days.

(21) Appl. No.: 16/162,607

(22) Filed: Oct. 17, 2018

(65) Prior Publication Data
US 2020/0121141 A1    Apr. 23, 2020

(51) Int. Cl.
*A47K 17/02* (2006.01)
*F16B 7/04* (2006.01)
(Continued)

(52) U.S. Cl.
CPC .......... *A47K 17/022* (2013.01); *A47B 57/265* (2013.01); *A47B 57/545* (2013.01);
(Continued)

(58) Field of Classification Search
CPC ...... A47K 17/022; A47K 3/003; A47K 3/001; A47K 3/12; A47K 3/122; A47K 10/04; A47K 3/125; A47K 3/282; A47K 10/10; A47K 17/024; A47G 25/06; A47G 25/0664; A47G 25/0614; A47G 25/0692;
(Continued)

(56) References Cited

U.S. PATENT DOCUMENTS

| 424,730 | A | * | 4/1890 | Schoonmaker | ........ | A47C 9/002 |
| | | | | | | 297/314 |
| 2,174,650 | A | * | 10/1939 | Bentz | ..................... | A47K 10/04 |
| | | | | | | 211/119.011 |

(Continued)

FOREIGN PATENT DOCUMENTS

| DE | 202006007835 U1 | 8/2006 |
| DE | 202015100257 U1 | 4/2016 |
| JP | 3406538 B2 | 5/2003 |

*Primary Examiner* — Jennifer E. Novosad
(74) *Attorney, Agent, or Firm* — Brooks Kushman P.C.; Lora Graentzdoerffer

(57) ABSTRACT

An adjustable bathroom handrail assembly is provided with a pair of elongate vertical handles with mounting hardware to mount to an upright support surface and spaced apart from the upright support surface. An adjustable horizontal bar extends between the pair of vertical handles, and a locking mechanism connects the at least one adjustable horizontal bar and one of the pair of elongate vertical handles. A locking mechanism is located at an intersection of the horizontal bar and the one of the elongate vertical handles. A method for installing and adjusting wall-mount hardware installs a pair of elongate vertical handles to an upright support surface. The ends of a horizontal bar are installed onto the pair of elongate vertical handles. A locking mechanism on the horizontal bar is disengaged to adjust the horizontal bar to a location along the pair of elongate vertical handles.

16 Claims, 4 Drawing Sheets

(51) Int. Cl.
*A47K 3/12* (2006.01)
*A47B 96/14* (2006.01)
*A47B 57/26* (2006.01)
*A47B 57/54* (2006.01)
*A47K 3/03* (2006.01)

(52) U.S. Cl.
CPC ............ *A47B 96/1408* (2013.01); *A47K 3/03* (2013.01); *A47K 3/122* (2013.01); *A47K 17/024* (2013.01); *F16B 7/044* (2013.01)

(58) Field of Classification Search
CPC ......... A47G 27/06; D06F 57/16; D06F 57/08; A47F 5/08; A47F 5/103; A47H 1/02; F16B 7/044; A47B 96/067; A47B 96/1408; A47B 57/06; A47B 57/16; A47B 57/20; A47B 57/26; A47B 57/265; A47B 57/54; A47B 57/545
USPC ........ 211/119.011, 119.009, 87.01, 88.04, 6, 211/16, 123, 105.1–105.6, 182, 103, 187, 211/190; 4/576.1, 577.1, 578.1, 571.1, 4/579, 584, 590, 592; 248/214, 251, 248/219.4, 219.3, 218.4, 246, 244, 245, 248/227.4, 289.11, 295.11, 297.31, 248/276.11, 278.1, 279.1
See application file for complete search history.

(56) References Cited

U.S. PATENT DOCUMENTS

| | | | | |
|---|---|---|---|---|
| 2,181,543 A * | 11/1939 | Bentz | ............... | A47K 10/04 211/119.011 |
| 2,242,461 A * | 5/1941 | Fisher | ............... | A47K 3/003 4/576.1 |
| 2,617,538 A * | 11/1952 | Martin | ............... | D06F 57/12 211/123 |
| 2,815,513 A * | 12/1957 | Tilson | ............... | A47K 3/003 4/576.1 |
| 2,817,095 A * | 12/1957 | Jeffries | ............... | A47K 3/003 4/576.1 |
| 2,885,690 A * | 5/1959 | Scott | ............... | A47K 3/003 4/576.1 |
| 2,965,153 A * | 12/1960 | Purcell, Sr. | ............... | A47K 3/122 248/240.1 |
| 3,568,220 A * | 3/1971 | Dees | ............... | A47K 3/003 4/576.1 |
| 4,034,425 A * | 7/1977 | Van Riemsdyck | .... | A47K 3/122 4/576.1 |
| 4,162,544 A * | 7/1979 | Freeman | ............... | A47K 3/001 4/576.1 |
| 4,498,204 A | 2/1985 | Warner | | |
| 4,717,105 A * | 1/1988 | Stefani | ............... | A47K 3/034 211/103 |
| 4,932,498 A * | 6/1990 | Miller | ............... | E06C 7/48 182/107 |
| 4,944,478 A * | 7/1990 | Sullivan | ............... | A47K 3/003 211/105.1 |
| 5,236,095 A * | 8/1993 | Krizka | ............... | A47F 5/13 211/102 |
| D342,435 S * | 12/1993 | Boyle | ............... | D6/548 |
| 5,329,651 A * | 7/1994 | Mardero | ............... | A47K 3/003 4/561.1 |
| 5,465,437 A * | 11/1995 | Herman | ............... | A47K 3/122 297/344.24 |
| 5,823,366 A * | 10/1998 | Bellamy | ............... | A47K 3/004 211/119.011 |
| 5,950,256 A * | 9/1999 | Slater | ............... | A47K 3/122 297/14 |
| 6,033,351 A * | 3/2000 | Sizemore, III | ........... | A63B 1/00 482/111 |
| 6,206,210 B1 * | 3/2001 | Reed | ............... | A47F 5/0087 211/168 |
| 6,507,960 B1 * | 1/2003 | Kelly | ............... | A47K 3/003 4/576.1 |
| 6,807,690 B1 * | 10/2004 | Satterfield | ............... | A47K 3/282 297/14 |
| 6,922,857 B2 * | 8/2005 | Palma | ............... | A47K 3/12 4/573.1 |
| 7,080,417 B2 * | 7/2006 | Jiang | ............... | A47C 9/06 297/14 |
| 7,086,633 B2 * | 8/2006 | Welch | ............... | A47B 57/265 108/147.13 |
| 7,107,651 B1 * | 9/2006 | Lin | ............... | A47K 3/003 16/422 |
| 7,124,451 B2 * | 10/2006 | Moore | ............... | A47K 3/003 4/576.1 |
| 7,155,757 B1 * | 1/2007 | Zamora, Jr. | .......... | A61G 7/1003 4/579 |
| 7,603,728 B2 * | 10/2009 | Roth | ............... | A47K 3/003 248/205.7 |
| D623,928 S * | 9/2010 | Weber | ............... | D8/376 |
| 8,028,845 B2 * | 10/2011 | Himes | ............... | A47B 47/021 211/103 |
| 8,042,477 B2 * | 10/2011 | Lee | ............... | A47B 57/54 108/109 |
| 8,286,564 B2 * | 10/2012 | Karl | ............... | A47B 57/545 108/107 |
| 8,393,020 B2 * | 3/2013 | Grant | ............... | A47K 3/003 16/436 |
| 8,752,219 B2 * | 6/2014 | Hoernig | ............... | E03C 1/24 4/578.1 |
| 8,783,474 B2 | 7/2014 | Kuhlman | | |
| D784,035 S * | 4/2017 | Longo | ............... | D6/362 |
| 9,784,415 B2 | 10/2017 | Linge | | |
| 9,968,226 B1 * | 5/2018 | Anderson | ............... | A47K 3/122 |
| D861,390 S * | 10/2019 | Nichols | ............... | D6/672 |
| 2006/0053547 A1 * | 3/2006 | Farrow | ............... | A47K 17/024 4/576.1 |
| 2007/0086852 A1 * | 4/2007 | Goad | ............... | A47K 17/022 403/292 |
| 2008/0098510 A1 * | 5/2008 | O'Brien | ............... | A47K 17/022 4/576.1 |
| 2008/0184475 A1 * | 8/2008 | Sladick | ............... | A47K 17/022 4/576.1 |
| 2008/0222790 A1 * | 9/2008 | Grant | ............... | A47K 3/003 4/576.1 |
| 2008/0289296 A1 | 11/2008 | Weber | | |
| 2009/0173704 A1 * | 7/2009 | Kotajarvi | ............... | A47K 10/04 211/88.04 |
| 2009/0266774 A1 * | 10/2009 | Maclaren-Taylor | ... | A47K 10/06 211/45 |
| 2014/0134358 A1 | 5/2014 | Hart | | |
| 2015/0327728 A1 | 11/2015 | Aubain et al. | | |

* cited by examiner

ADJUSTABLE BATHROOM HANDRAIL ASSEMBLY

TECHNICAL FIELD

Various embodiments relate to adjustable bathroom handrail assemblies.

BACKGROUND

A safety bar system is illustrated and described in U.S. Pub. No. US 2008/0289296 A1, which issued on Nov. 27, 2008 to Sidney L. Weber.

SUMMARY

According to one embodiment, an adjustable bathroom handrail assembly with a pair of elongate vertical handles is provided. The vertical handles include mounting hardware to be mounted to an upright support surface and are spaced apart from the upright support surface. At least one adjustable horizontal bar extends between the pair of vertical handles, and at least one locking mechanism connects the at least one adjustable horizontal bar and one of the pair of elongate vertical handles.

According to a further embodiment, the at least one locking mechanism is located at an intersection of the at least one horizontal bar and the one of the pair of elongate vertical handles.

According to another further embodiment the at least one locking mechanism also includes a guide to permit translation of the horizontal bar along the elongate vertical handles.

According to another further embodiment, the at least one locking mechanism includes a lever positioned to face the upright support surface. A pin is connected to the lever, sized to be received within one of a series of apertures on the elongate vertical handles. A biasing member in cooperation with the lever to bias the pin into engagement with one of the series of apertures.

According to another further embodiment, a second adjustable horizontal bar extends between the pair of vertical handles.

According to another further embodiment, the adjustable horizontal bar is enclosed within a polymeric material.

According to another further embodiment a portable seat is supported upon the horizontal bar.

According to another further embodiment, at least one light source is oriented on the horizontal bar.

According to another further embodiment, a container is supported upon the horizontal bar.

According to another embodiment, an adjustable bathroom handrail assembly is provided with a pair of elongate vertical handles with mounting hardware to be mounted to an upright support surface. A series of apertures is formed on a side of the pair of vertical handles facing the upright support surface. At least one adjustable horizontal bar extends between the pair of vertical handles. At least one locking mechanism is provided at an intersection between the horizontal bar and the elongate vertical handles.

According to a further embodiment, a second adjustable horizontal bar extends between the pair of vertical handles.

According to another further embodiment, the at least one locking mechanism includes a guide to permit translation of the horizontal bar along the elongate vertical handles.

According to another further embodiment, the at least one locking mechanism includes a lever positioned to face the upright support surface.

According to an even further embodiment, the locking mechanism further includes a pin connected to the lever, sized to be received within one of the series of apertures.

According to another further embodiment, the locking mechanism also includes a biasing member in cooperation with the lever to bias the pin into engagement with one of the series of apertures.

According to another further embodiment, the adjustable horizontal bar is enclosed within a polymeric material.

According to another further embodiment, a portable seat is supported upon the horizontal bar.

According to another further embodiment, a container is supported upon the horizontal bar.

According to another further embodiment, at least one light source is oriented on the second horizontal bar.

According to another embodiment, a method for installing and adjusting wall-mount hardware installs a pair of elongate vertical handles to an upright support surface. The ends of a horizontal bar are installed onto the pair of elongate vertical handles. A locking mechanism on the horizontal bar is disengaged to adjust the horizontal bar to a location along the pair of elongate vertical handles.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Adjustable handrail assemblies are oftentimes difficult to adjust due to adjustment mechanisms that are not designed ergonomically. Additionally, locking mechanisms that position horizontal members at differing heights are complicated—making adjustment difficult for the end user. Ultimately, the end user does not have proper leverage to hold onto the rail while adjusting the horizontal rail at differing heights.

The embodiment allows an end user to hold onto a pair of vertical handles with one thumb for support while adjusting a locking mechanism with the remaining fingers. This embodiment is useful in multi-generational households. The vertical handles can extend the length of the support surface, which allows for any end user, regardless of height, to utilize the handrail. In addition, since the mechanism is simple to use, any end user, regardless of age or ability, can utilize the handrail. Thus, this embodiment eliminates the need for multiple handrail assemblies inside an enclosure.

Figure 1:
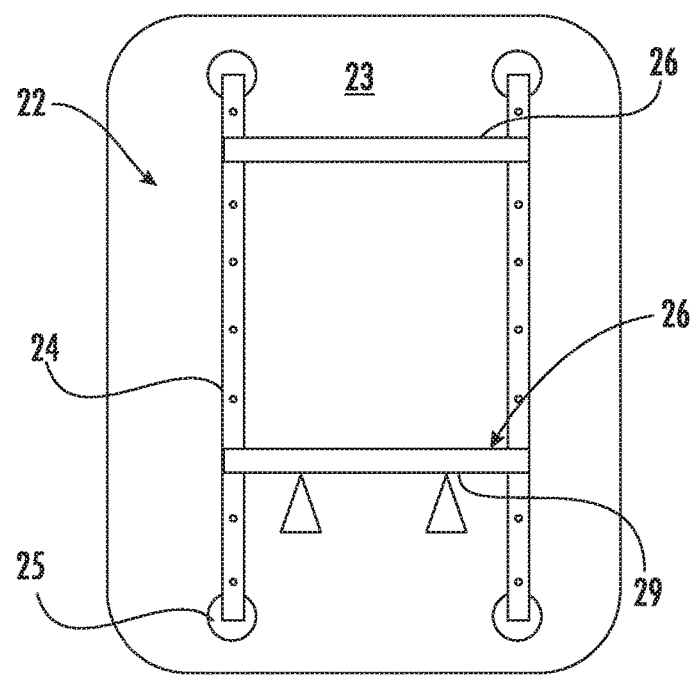
FIG. 1 is a front view of the adjustable handrail assembly with a light source orientated on a horizontal bar.

With reference now to FIG. 1, an adjustable bathroom handrail assembly 22 is illustrated. The handrail assembly 22 can be mounted to any upright support surface 23 such as a bathroom wall, shower wall, or the like. A pair of elongate vertical handles 24 are also illustrated. The vertical handles 24 are support members attached to and spaced apart from the upright support surface 23. The handrail assembly 22 is mounted to the upright support surface 23 by mounting hardware posts 25 at the ends of the vertical handles 24. The vertical handles 24 are formed from suitable structural materials, such as stainless steel, plastic, or the like.

Figure 2:
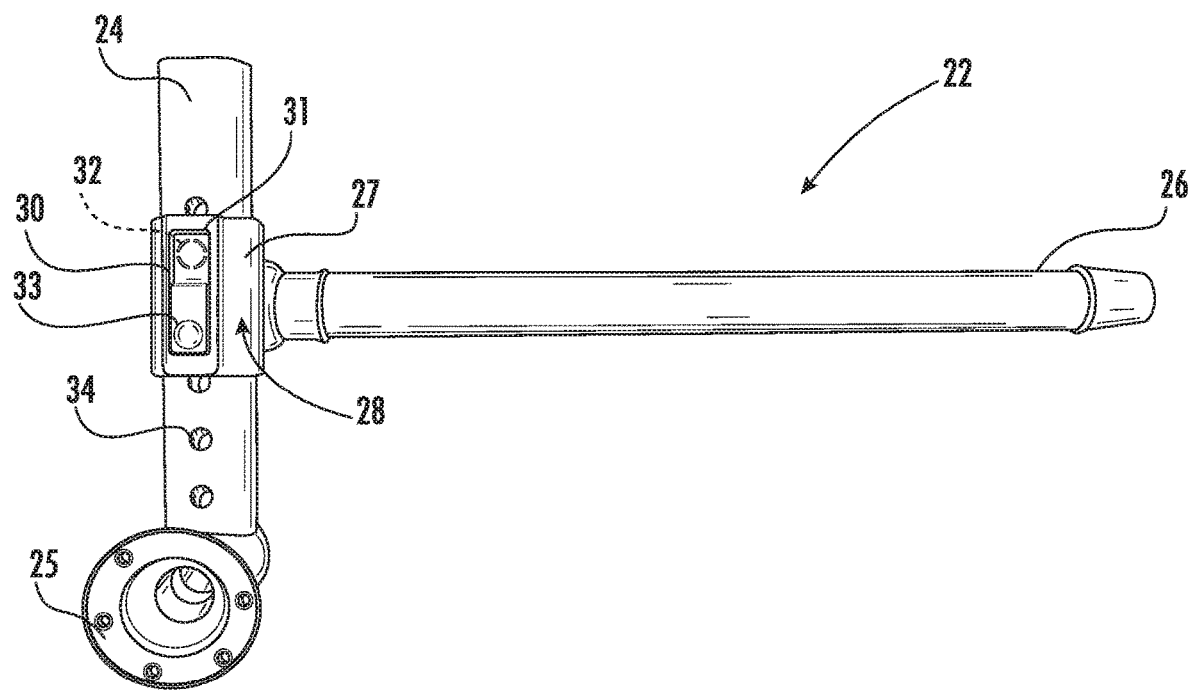
FIG. 2 is a partial rear view of the adjustable handrail assembly.
Figure 3:
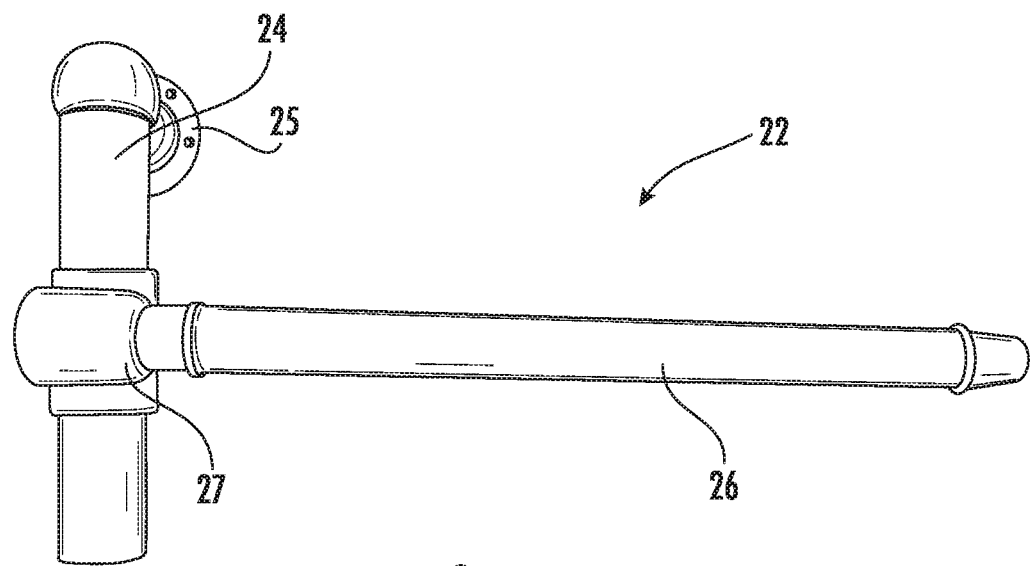
FIG. 3 is a partial front view of the adjustable handrail assembly in FIG. 2.

With reference now to FIGS. 2 and 3, a partial rear view of a horizontal bar 26 and locking mechanism 28 is illustrated according to an embodiment. The horizontal bar 26 is a member on the handrail assembly 22 that an end user can clasp for support. In a further embodiment, various compartments are supported on the horizontal bar 26. The horizontal bar 26 extends between the vertical handles 24. The horizontal bar 26 is interconnected to the vertical handles by a pair of the locking mechanisms 28, each at the intersection of the horizontal bar 26 and one of the pair of elongate vertical handles 24. The horizontal bar 26 may be formed of any suitable material, such as plastic, stainless steel, polished chrome, polished nickel or the like.

The locking mechanism 28 is formed on the backside of the horizontal bar 26 as illustrated in FIG. 2. The locking mechanism 28 provides the end user the ability to adjust the horizontal bar 26 at differing heights along the vertical handles 24. The locking mechanism includes a guide 27 that an end user can grab to permit the translation of the horizontal bar 26 along the vertical handles 24.

The locking mechanism 28, includes a lever 30 pivotally connected to the guide 27. A pin 32 extends from the lever 30 into the guide 27. The lever 30 includes an upper indentation 31 and a lower indentation 33 that the end user can manually depress to disengage and reengage the locking mechanism 28. The lever 30 is positioned to face the upright support surface 23, which allows an end user to hold onto the guide 27 with their thumbs for support and utilize a finger to actuate the lever 30.

The pin 32 is connected to and extends from the proximal end of the lever 30 away from the upright support surface. In an embodiment, the pin 32 is connected to the upper indentation 31 of the lever 30. The pin 32 is sized to be received within one of a series of apertures 34. The apertures 34 are formed into a backside of the vertical handles 24. When the end user pushes the lower indentation 33 on the lever 30, the pin 32 is retracted out of one the series of apertures 34 and unlocks the horizontal bar 26 from the vertical handles 24. The end user is then free to slide the horizontal bar 26 using the guide 27 to differing heights on the vertical handles 24. Once the appropriate height is selected, the end user can then push the upper indentation 31 on the lever 30 to slide the pin 32 back into the series of apertures 34. A biasing member (not shown) is provided within the locking mechanism 28 to return the lever 30 to the engaged position.

Referring again to FIG. 1, the horizontal bar 26 may be provided with a plurality of light sources 29, such as light-emitting diode assemblies to provide a targeted light output as selected and adjusted by the end user.

Figure 4:
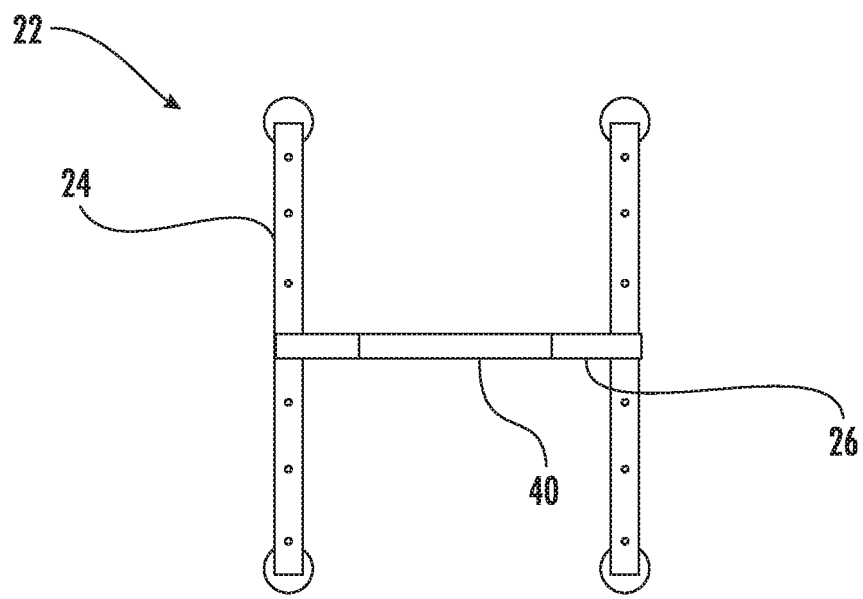
FIG. 4 is a front view of the adjustable bathroom handrail assembly in FIG. 1, illustrating the horizontal bar enclosed with a polymeric material.

With reference now to FIG. 4, a front view of the adjustable handrail assembly 22 is depicted. In some situations, the end user may have trouble gripping the horizontal bar 26 when entering or exiting the shower. Thus, the horizontal bar 26 is enclosed with a polymeric material 40 to enhance gripping and to minimize slipping when utilizing the handrail assembly 22. Although one horizontal bar is depicted, any number of horizontal bars are contemplated.

Figure 5:
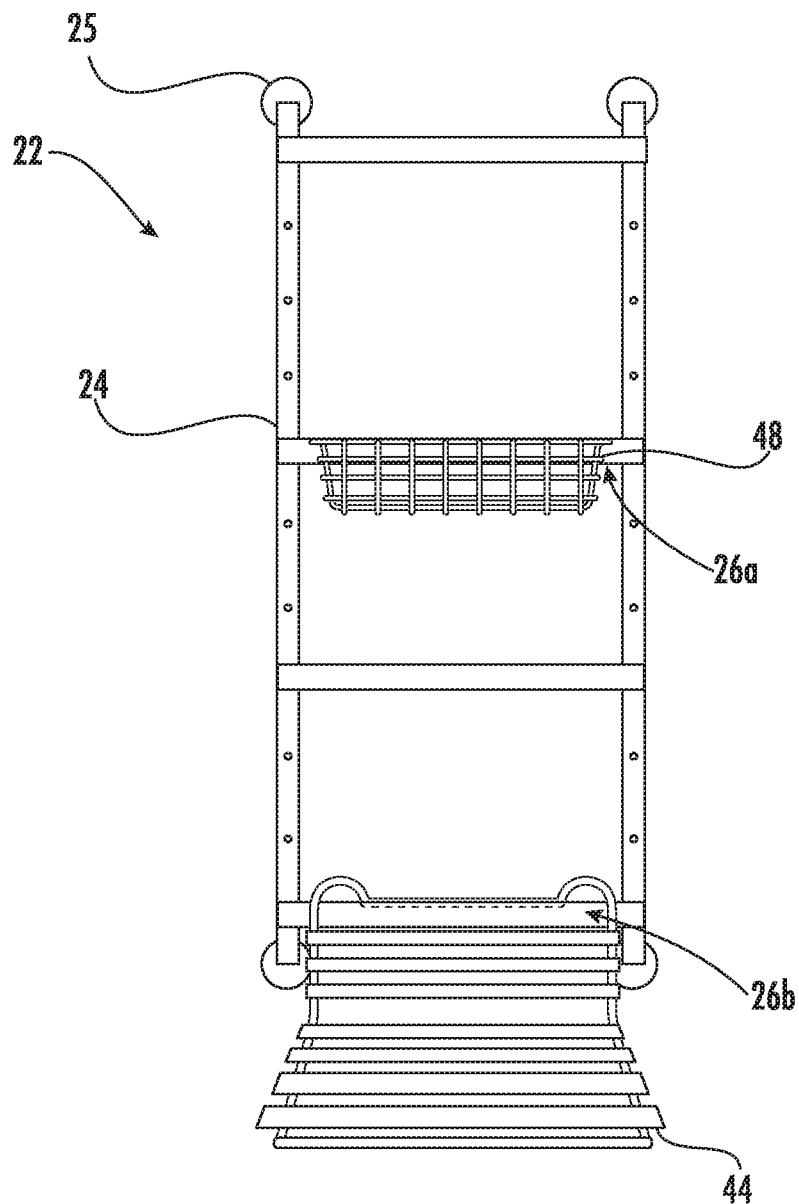
FIG. 5 is a front view of the adjustable bathroom handrail assembly of FIG. 1, illustrating a portable seat and container supported upon the horizontal bar and second horizontal bar respectively.

With reference now to FIG. 5, another front view of the adjustable handrail assembly 22 is illustrated according to another embodiment. The adjustable handrail assembly 22 includes a plurality of horizontal bars 26. One of the horizontal bars 26a supports a container or basket 48. The basket 48 may be employed for supporting various bathroom items.

Figure 6:
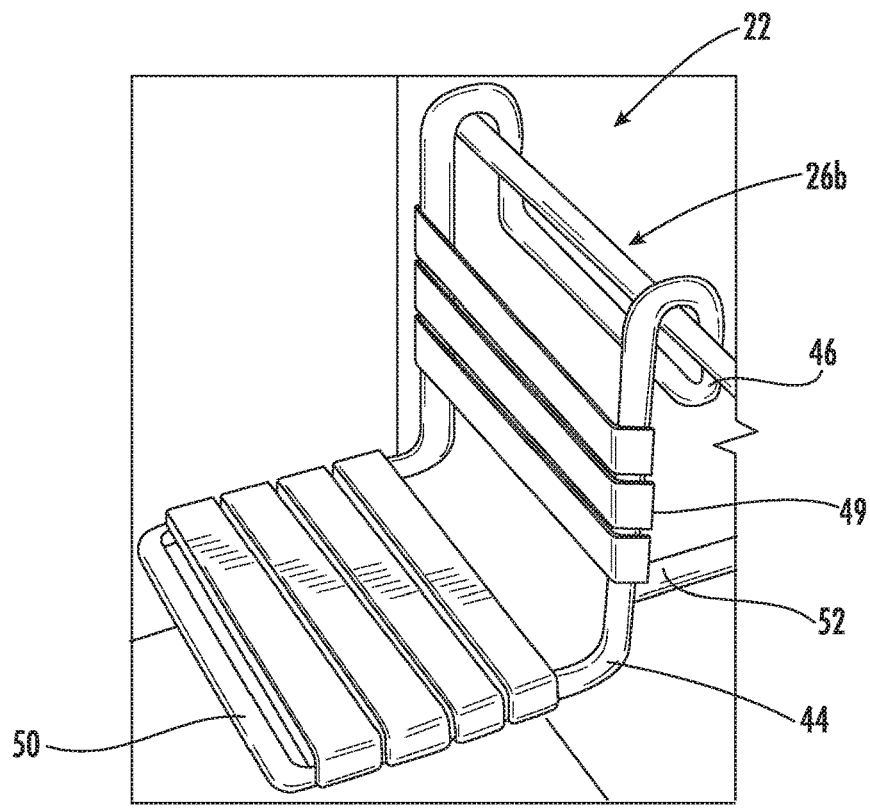
FIG. 6 is an enlarged partial perspective view of the adjustable bathroom handrail assembly in FIG. 5, illustrating the portable seat.

Referring now to FIGS. 5 and 6, another horizontal bar 26b may be utilized to support portable seat 44. The portable seat 44 includes a bracket 46 that extends over the horizontal bar 26b. A seat back 49 extends down from the bracket 46. A seat bottom 50 extends forward from, and perpendicular to the seat back 49. A pair of stabilizer posts 52 extend from the seat back 48 to engage the upright support surface 23 to stabilize the seat 44 against the wall 23. The seat 44 supported upon the horizontal bar 26 allows an end user to adjust the portable seat 44 to an appropriate height on the vertical handles 24, as illustrated in FIG. 6.

Figure 7:
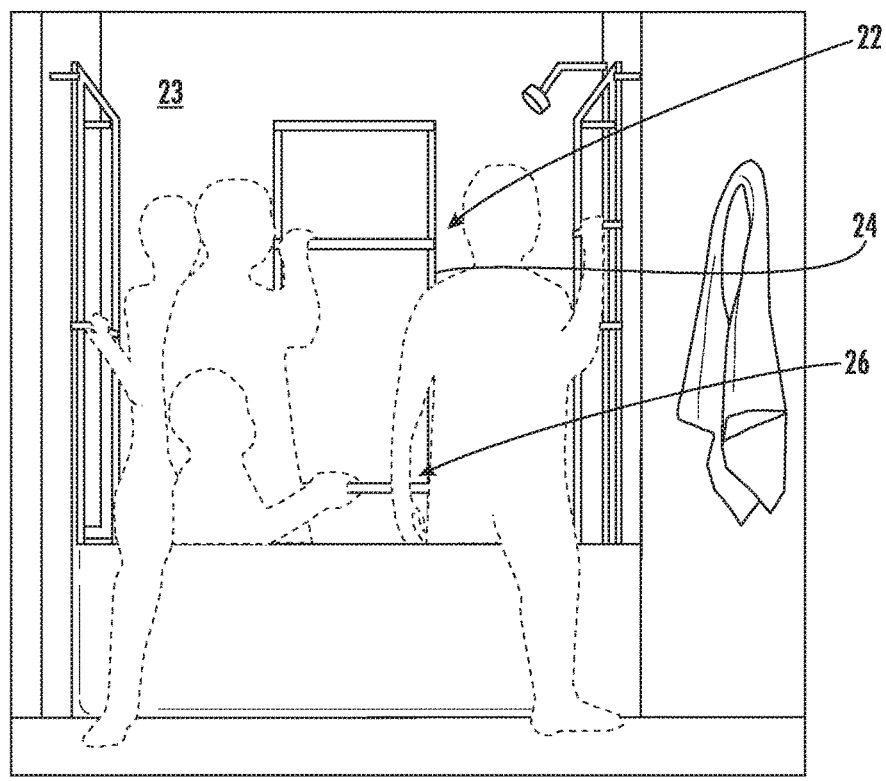
FIG. 7 is a front view of the adjustable bathroom handrail assembly of FIG. 1 installed onto a shower wall.

With reference now to FIG. 7, a front view of the adjustable handrail assembly 22 is provided. As depicted, the adjustable handrail assembly 22 can be mounted to different sides of a shower wall 23. An end user may use the horizontal bar 26 or the vertical handles 24 for support to access the shower. The end user may then adjust the horizontal bar 26 to differing heights, regardless of age, height, or ability.

In an embodiment, the method for installing and adjusting wall-mount hardware is provided. The vertical handles 24 are installed to an upright support surface, spaced apart to allow an end user of any age, height or ability to grab onto the pair of vertical handles 24. The ends of the horizontal bar 26 are then installed onto the vertical handles 24. The locking mechanism 28, located at the intersection between the horizontal bar 26 and the vertical handles 24, can then be disengaged in order to adjust the horizontal bar 26 along the pair of vertical handles 24 at various heights.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An adjustable bathroom handrail assembly comprising:
   a pair of elongate vertical handles with mounting hardware to be mounted to an upright support surface and spaced apart from the upright support surface for a user to grab onto the pair of vertical handles;
   at least one adjustable horizontal bar extending between the pair of vertical handles; and
   at least one locking mechanism connecting the at least one adjustable horizontal bar and one of the pair of elongate vertical handles;
   wherein the at least one locking mechanism comprises:

a guide to permit translation of the at least one adjustable horizontal bar along the pair of elongate vertical handles, a lever connected to the guide, and a pin connected to the lever, extending from the lever away from the support surface, and sized to be received within one of a series of apertures on the elongate vertical handles; and wherein the lever is positioned to face the upright support surface.

2. The adjustable bathroom handrail assembly of claim 1 wherein the at least one locking mechanism is located at an intersection of the at least one horizontal bar and one of the pair of elongate vertical handles.

3. The adjustable bathroom handrail assembly of claim 1 further comprising a second adjustable horizontal bar extending between the pair of vertical handles.

4. The adjustable bathroom handrail assembly of claim 1 wherein the adjustable horizontal bar is enclosed within a polymeric material.

5. The adjustable bathroom handrail assembly of claim 1 further comprising a portable seat supported upon the horizontal bar, wherein the portable seat comprises:
   a bracket sized to extend over the at least one adjustable horizontal bar to support the portable seat;
   a seat back extending down from the bracket;
   a seat bottom extending forward from the seat back; and
   at least one stabilizer extending from the seat back to engage the upright support surface to stabilize the portable seat.

6. The adjustable bathroom handrail assembly of claim 1 further comprising at least one light source oriented on the horizontal bar.

7. The adjustable bathroom handrail assembly of claim 1 further comprising a container supported upon the horizontal bar.

8. The adjustable bathroom handrail assembly of claim 1, wherein the at least one locking mechanism allows an end user to hold onto the pair of vertical handles with one thumb for support while adjusting the locking mechanism with remaining fingers.

9. An adjustable bathroom handrail assembly comprising:
   a pair of elongate vertical handles with mounting hardware to be mounted to an upright support surface and spaced apart from the upright support surface for a user to grab onto the pair of vertical handles, wherein a series of apertures is formed on a side of the pair of vertical handles facing the upright support surface;
   at least one adjustable horizontal bar extending between the pair of vertical handles; and
   at least one locking mechanism at an intersection between the horizontal bar and the elongate vertical handles comprising a guide and a lever connected to the guide to permit translation of the horizontal bar along the elongate vertical handles, such that the user may depress the lever to disengage the locking mechanism, wherein the lever is positioned to face the upright support surface.

10. The adjustable bathroom handrail assembly of claim 9 further comprising a second adjustable horizontal bar extending between the pair of vertical handles.

11. The adjustable bathroom handrail assembly of claim 9 wherein the locking mechanism further comprises a pin connected to the lever, sized to be received within one of the series of apertures.

12. The adjustable bathroom handrail assembly of claim 11 wherein an indentation is formed on the lever to be manually depressed to pivot the lever to disengage the pin from the aperture to unlock the locking mechanism.

13. The adjustable bathroom handrail assembly of claim 9 wherein the adjustable horizontal bar is enclosed within a polymeric material.

14. The adjustable bathroom handrail assembly of claim 9 further comprising a portable seat supported upon the horizontal bar, wherein the portable seat comprises:
   a bracket sized to extend over the at least one adjustable horizontal bar to support the portable seat;
   a seat back extending down from the bracket;
   a seat bottom extending forward from the seat back; and
   at least one stabilizer extending from the seat back to engage the upright support surface to stabilize the portable seat.

15. The adjustable bathroom handrail assembly of claim 9 further comprising a container supported upon the horizontal bar.

16. The adjustable bathroom handrail assembly of claim 9 further comprising at least one light source oriented on the horizontal bar.

* * * * *